(12) United States Patent
Schwonke et al.

(10) Patent No.: US 6,224,804 B1
(45) Date of Patent: May 1, 2001

(54) LOW-EMISSION ELASTOMER FLOOR COVERING

(75) Inventors: Karl-Heinz Schwonke, Fréudental; Tilman Griesinger; Bernd Fischer, both of Löchgau; Heinz Von Olnhausen, Bietigheim-Bissingen, all of (DE)

(73) Assignee: DLW Aktiengesellschaft (DE)

( * ) Notice: Subject to any disclaimer, the term of this patent is extended or adjusted under 35 U.S.C. 154(b) by 0 days.

(21) Appl. No.: 09/202,064

(22) PCT Filed: Jun. 11, 1997

(86) PCT No.: PCT/EP97/03038

§ 371 Date: Apr. 22, 1999

§ 102(e) Date: Apr. 22, 1999

(87) PCT Pub. No.: WO97/47802

PCT Pub. Date: Dec. 18, 1997

(30) Foreign Application Priority Data

Jun. 14, 1996 (DE) .............................. 196 23 790
Dec. 20, 1996 (DE) .............................. 196 53 650

(51) Int. Cl.⁷ .................................................. B32B 31/30
(52) U.S. Cl. ................................. 264/173.12; 427/389.9
(58) Field of Search ..................... 524/570; 264/173.12; 427/389.9

(56) References Cited

U.S. PATENT DOCUMENTS

| | | | |
|---|---|---|---|
| 4,088,714 | * | 5/1978 | Huff ....................... 260/897 |
| 4,244,861 | * | 1/1981 | Spenadel ............. 260/42.33 |
| 4,524,099 | * | 6/1985 | Luccio ................. 428/213 |
| 4,559,250 | * | 12/1985 | Paige ..................... 428/40 |
| 4,614,680 | * | 9/1986 | Fry ......................... 428/158 |
| 4,722,973 | * | 2/1988 | Yamaoka ............... 525/240 |
| 5,143,978 | * | 9/1992 | Berta ..................... 525/240 |
| 5,604,290 | * | 2/1997 | Aikawa ................. 524/529 |
| 5,741,858 | * | 4/1998 | Brann .................... 525/101 |
| 5,750,600 | * | 5/1998 | Nozokido ............. 524/100 |

FOREIGN PATENT DOCUMENTS

| | | |
|---|---|---|
| 43 40 478 A1 | 6/1995 | (DE) . |
| 0 621 128 A2 | 10/1994 | (EP) . |
| 0 755 971 A2 | 1/1997 | (EP) . |
| 0 780 207 A2 | 6/1997 | (EP) . |
| 2 654 671 | 5/1991 | (FR) . |
| WO 96/04419 | 2/1996 | (WO) . |

* cited by examiner

*Primary Examiner*—Paul R. Michl
(74) *Attorney, Agent, or Firm*—Womble Carlyle Sandridge & Rice, PLLC

(57) ABSTRACT

The present invention relates to a floor covering that causes essentially no unpleasant odors and/or health damaging emissions and which furthermore shows no signs of discoloration by aging for a lengthy time period, as well as a method for manufacturing the floor covering.

18 Claims, 2 Drawing Sheets

LOW-EMISSION ELASTOMER FLOOR COVERING

DESCRIPTION

The present invention relates to a floor covering that causes essentially no unpleasant odors and/or health damaging emissions and furthermore will show no discoloration by aging for a lengthy time period, as well as a method for manufacturing the floor covering.

Rubber-based elastomer coverings are one of the higher quality floor coverings because of their durability and high utility. Vulcanization and processing additives or agents have the tendency to emit chemical elements from the floor covering in their unchanged or chemically altered form.

In general, rubbers of various types that may be vulcanized are used as polymeric binders for floor coverings. These rubbers are mainly SBR (styrene-butadiene rubber), NR (natural rubber), IR, IIR and NBR rubber whereby cross-linking is caused by cross-linking agents like sulfur, in combination with vulcanization additives. These vulcanization additives may be vulcanization accelerators like mercapto compounds, sulfenamides, thiuram, guanidine, dithiocarbamate, and amines; vulcanization decelerators like phthalic anhydride and N-cyclohexyl thiophthalimide, and preservatives like 2-mercapto benzimidazole; masticators like 2,2'-dibenzamido-diphenyl-disulfide; softeners or processing oils, strengthening resins like phenol-formaldehyde resin and vulcanization activators like zinc oxide. These cross-linking agents and additives are not totally converted during the vulcanization process. Thereby these additives or the by-products generated during the vulcanization process remain partially in the system or are emitted from this rubber system. This emission process may last for a long time period. This occurs in floor covering mainly when it is removed from packaging and is installed on the floor with an adhesive on a suitable backing. Temperature, humidity and ventilation of an enclosed area further influence the process of emission.

In general, an unpleasant odor derives from the emitting vulcanization additives in the rubber system or from the by-products generated during the vulcanization process and this may also be health damaging in certain concentrations. It also has been shown that emitting substances from rubber-based floor coverings may stain white walls (plaster, wall paints etc.) under certain circumstances. Additionally, rubber-based elastomer floor coverings undergo an aging process that may be noticed as a disadvantage in the discoloring of design floor covering, for example by yellowing.

Therefore, the problem underlying the present invention is to provide a floor covering that is low in emission, resists the aging process, may be designed in variable colors, is aesthetic, is manufactured homogeneously and has elastomeric rubber-like qualities without the presence of vulcanized rubber.

This problem is solved by the embodiments characterized in the patent claims. In particular, a floor covering is provided that contains at least one elastomer based on a polyolefin with a density of <0.918 $g/cm^3$ as a polymeric binder. The elastomer may be polyethylene with a very low density (PE-VLD) or a copolymer from ethylene with at least one additional olefin, like propene or butene. Preferably, a PE-VLD with a density of about 0.85–0.892 $g/cm^3$ is used, more preferred is a density of 0.86–0.87 $g/cm^3$.

The polyolefin used according to the invention, is cross-linked with a suitable cross-linking agent, an aromatic-free organic peroxide and with process enhancing additives like alkylenealkoxysilanes, trialkylencyanurate as well as dibutyltin dilaurate or mixtures thereof. For example, suitable cross-linking agents are as follows:

|   |   | Range weight % | Preferred range weight % |
|---|---|---|---|
| peroxide | DHBP: 2,5 dimethyl-2,5di-(tert.-butylperoxy) hexan (Peroxidchemie Company) | 0–4.0 | 0.1–1.2 (e.g. up to 0.4) |
| alkylenealkoxy-silanes | vinyltrimethoxyhydrosilicone or vinyltriethoxyhydrosilicone (Wacker Company) | 0–4.0 | 0–1.0 (e.g. up to 0.4 |
| trialkylene-cyanurate | trialkylenecyanurate (Degussa Company) | 0–3.0 | 0.6–1.0 |
| catalyst | DBTL: dibutyltin dilaurate (Erbsloeh Company) | 0–0.2 | 0–0.05 |

The floor covering according to the present invention contains, for example, the above-defined thermoplastic polyolefin and elastomer, respectively, and its preferred ranges are as follows (weight percent):

|   |   | Range [%] | Preferred value [%] example |
|---|---|---|---|
| Binder PE-VLD | DOW XU 5800052 | 25–75 | 53.5 |
|  | DOW DSK 8801 | 25–75 | 53.5 |
| Binder PE-VLD | Exxon Exact 4041 | 25–75 | 53.5 |
|  | Exxon exact 4033 | 25–75 | 53.5 |

Furthermore, the floor covering according to the present invention may contain fillers or a mixture thereof. Examples of fillers and their preferred ranges are as follows (weight percent):

| Fillers | Type example | Supplier | Range [%] | Preferred value [%] example |
|---|---|---|---|---|
| quartz powder | Sirkon SF 300 | Quarzwerke GmbH | 0–50 | 22.5 |
| kaoline | Nucap EDL 200 | Lehmann & Voss & Co | 0–20 | 8.5 |
| talc | Alpha Talc CT 8/46 | Alpha-Calcit Fuellstoffe GmbH KG | 0–20 | 8.0 |
| wood dust | Holzmuehle Westerkamp & Co | wood dust type 120 | 0–50 | 25 |
| wood dust | Holzmuehle Westerkamp & Co | wood dust type 70 | 0–50 | 25 |
| dolomite | KL 30 | Naintsch Mineralwerke Graz | 0–40 | 20 |
| aluminum trihydroxide | Martinal ON 313 | Martinswerke GmbH | 0–30 | 15 |
| precipitated silica | P 820 | Degussa AG | 0–40 | 20 |
| heavy spar | Schwerspat TS | Sachtleben | 0–50 | 22.5 |
| chalk | Omyacarb 6 | Omya | 0–50 | 22.5 |

Furthermore, the following inorganic pigments may be contained, for example, in the floor covering according to the present invention depending on the color scheme and color matching, respectively (weight percent):

| Pigments | Supplier | Range [%] | Preferred value [%] (example) |
|---|---|---|---|
| Kronos 2200 | Kronos Titan | 0–8 | 3.5 |
| Bayferrox 140 | Bayer AG | 0–3 | " |
| Bayferrox 830 | Bayer AG | 0–3 | " |
| Hostaprint A 2 H 31 | Hoechst AG | 0–3 | " |

Optionally, the usual processing agents and process-enhancing additives, respectively, may be contained in the floor covering of the present invention. An example of such a processing agent is shown below (weight percent):

| Slip additive | Type example | Supplier | Range [%] | Preferred value [%] (example) |
|---|---|---|---|---|
| stearic acid | Barolub FTA | Barlocher GmbH | 0.1–1.5 | 1.0 |

In addition, antioxidants, UV stabilizers and such may be contained. Examples are as follows (weight percent):

| Stabilizers | Type example | Supplier | Range [%] | Preferred value [%] (example) |
|---|---|---|---|---|
| antioxidant | Irganox 1010 | Ciba Geigy AG | 0–0.5 | 0.1 |
| UV stabilizer | Chimassorb 944 Fl | Ciba Geigy AG | 0–0.5 | 0.1 |

By the elastomers used as a polymeric binder according to the present invention, the floor covering of the present invention has essentially no unpleasant odors and/or health damaging emissions in comparison to known floor coverings where SBR rubber is used as elastomer. Above all, the floor covering according to the present invention has a very high abrasion resistance in comparison to known rubber-based floor coverings. Surprisingly, the surface energy of the floor covering manufactured in such a manner may be increased by corona treatment so that the primer has better adhesion, which would result in better adhesive strength compared to rubber-based floor coverings. In addition, a lower discoloration (yellowing) during the life of the material has been found in the floor covering of the present invention. Thereby, a sufficiently flexible design and color scheme may be obtained in addition to a sufficiently aging resistance and low emission, while the desired elastomeric qualities still are maintained.

Another object of the present invention is a method for manufacturing the floor covering of the present invention, comprising the steps of providing a backing in form of sheeting and applying the above defined elastomers on one surface of the backing.

All material used for backing in floor covering that has been used up to now can still be used, may it be natural and/or synthetic fabric, woven cloth, or textile fabric. The following may be used, for example: Jute fabric, mixed fabrics made from natural fibers like cotton or viscose staple fiber, fiberglass cloth, fiberglass cloth coated with an adhesive agent, mixed fabrics made from synthetic fibers, fabrics made from mantle/core fibers like, for example a core of polyester and a mantle of polyamide.

In addition, a new method for manufacturing a low-emission floor covering has been established, which comprises the following steps:

(1) Compounding a cross-linkable mass that contains the previously described polyolefin and optionally at least one previously described process-enhancing additive and then preparing a sheeting by calender with subsequent milling to produce a grinding stock or direct granulating after extruder-compounding for the production of granules.

(2) Wetting of the grinding stock and granules (subsequently called "particles"), respectively, thus obtained with a solution that contains at least one aromatic-free organic peroxide used as a cross-linking agent and optionally white oil, whereby migration of peroxide into the grinding stock and granule-particles, respectively, is made possible.

(3) Mixing the wetted grinding stock and granules, respectively, with a powder mix, which contains polyethylene (PE) powder and optionally soot and/or mixed with previously defined pigments and/or fillers and/or process-enhancing agents and/or antioxidants and/or stabilizers and/or flame-retarding agents such as metalhydroxide, for example, whereby a free-flowing grinding stock and granules, respectively, are obtained mantled by the solution and the powder mix.

(4) Applying the thereby obtained free-flowing grinding stock and granules, respectively, on a backing or a suitable band and strip, respectively, where it is heated after pre-compressing by suitable means, for example by IR heater and/or hot air and the grinding stock and granules, respectively, are brought to a temperature of 160° C. or 140° C., for example, whereby the peroxide has sufficient stability at this temperature, characterized by the half life period, for example: >15 min or >1 h.

(5) Press-molding the thereby pre-heated material in a double strip press, double band or steel band auma, under a suitable molding pressure of 1.2 to 2 bar/cm$^2$, for example, and at a temperature of e.g. 195 to 200° C., whereby the half life period for peroxide is decreased in such a manner that simultaneously a cross-linking of the material is initiated by the peroxide. For example, the peroxide DEHP has a half life period amounting to $t_{1/2}$ of 1 min at a temperature of 190° C.

The texture or pattern of the cross-linked substance is uncovered after opening of the surface by grinding and/or splitting.

In another embodiment of the method according to the present invention, instead of the uncrosslinked mass used in step (1), there is used a partially cross-linked mass on the basis of the previously defined polyolefin, whereby a relief-texture of the flat product is obtained after press-molding in step (5). The partial cross-linking of the particles is caused during extruder compounding and before granulating, when granules are used, or during sheeting production and before milling, when the grinding stock is used. The partially cross-linked particles are deformed reversibly during press-molding and a raised or embossed texture is obtained by the restoring force after pressure release. The degree of cross-linking of the partially cross-linked substance may be adjusted by the quantity of peroxide.

The heating described in step (4) further enhances migration of the cross-linking agent into the grinding stock and granule-particles, respectively.

Another embodiment of the method according to the present invention is shown in step (1) where a cross-linkable mass, based on the previously defined polyolefin, is compounded with at least one cross-linking agent and optionally with a previously defined additive, whereby partially cross-linked granules may be obtained by controlling the time the substance is in the extruder (residence time) and the corresponding screw shape and the length of the extruder and by controlling the heating of partially cross-linked granules. According to this embodiment, the same possible patterns may be produced as with PVC technology. That means that a pre-determined texture may be obtained, for example. In particular, mechanical characteristics of elastomer floor coverings may be combined with the optical/texture characteristics of PVC floor coverings with this embodiment of the present invention.

In a further embodiment of the method according to the present invention, the mass in step (1) may be compounded additionally with a chemical foaming agent like sulfohydrazides or azodicarbonamides or combinations thereof, for example Lovopor 1417 (Lehmann & Voss Co.) or Tracel DB 145 (Tramaco GmbH). After cross-linking under pressure as given in step (5), foaming of the substance is obtained after pressure release. This embodiment may be utilized especially for floor coverings with foamed backings.

The advantages of the method of the present invention are especially the use of a powder mix containing polyethylene to make the wetted grinding stock and granules, respectively, flow freely, the stability of the peroxide compound as cross-linking agent up to the heating carried out in step (4) of the method of the present invention. By the use of an uncrosslinked or partially cross-linked mass, which means a cross-linkable mass without peroxide or with a very low amount of peroxide, the process may be controlled through the migration of the peroxide used in the solution for mantling of the grinding stock and granule-particles, respectively.

The figures illustrate the following:

Figure 1:
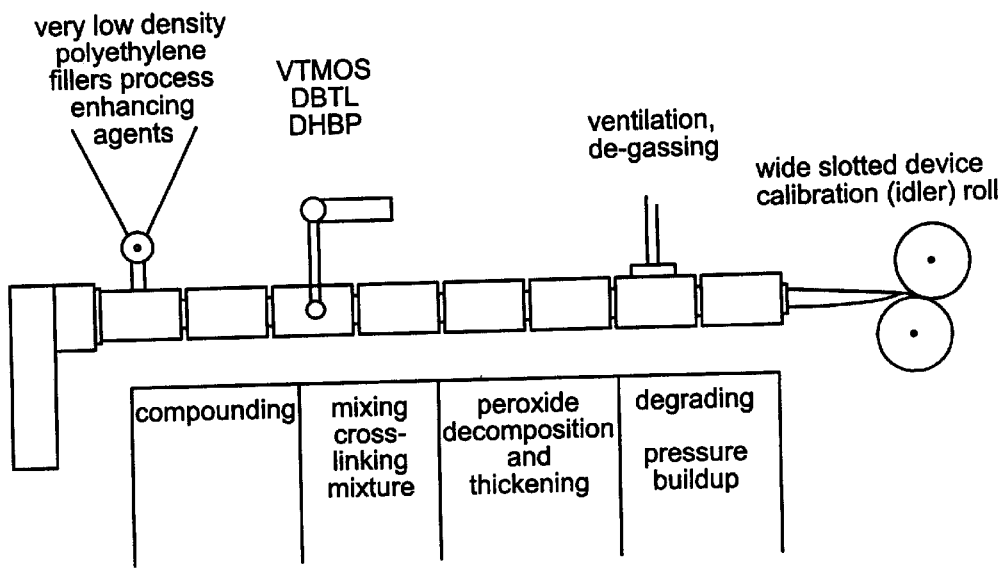
FIG. 1 is a schematic illustration of a mechanism and apparatus, respectively, for the production of the floor covering of the present invention (see example 1).
Figure 2:
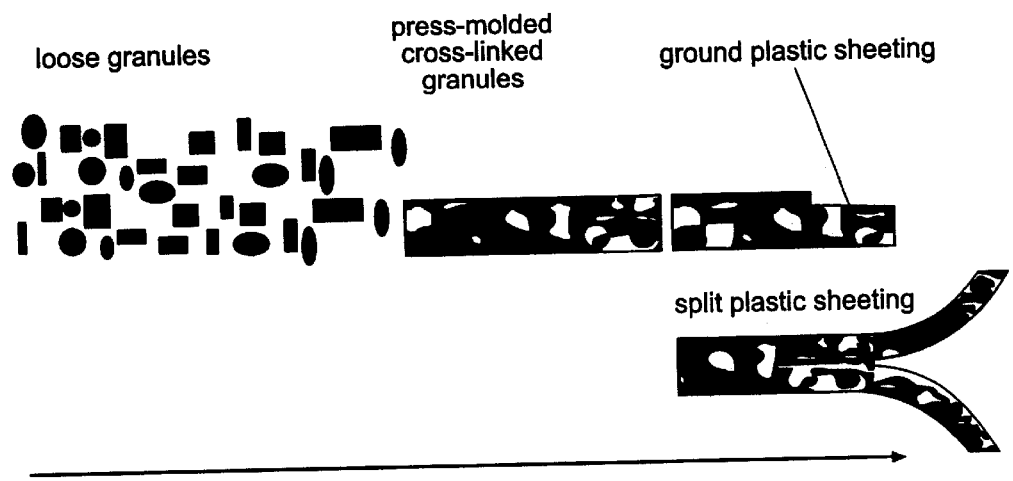
FIG. 2 is a schematic illustration of a preferred embodiment (in the direction of the arrow) for the production of plastic sheeting according to the present invention (see example 2).
Figure 3:
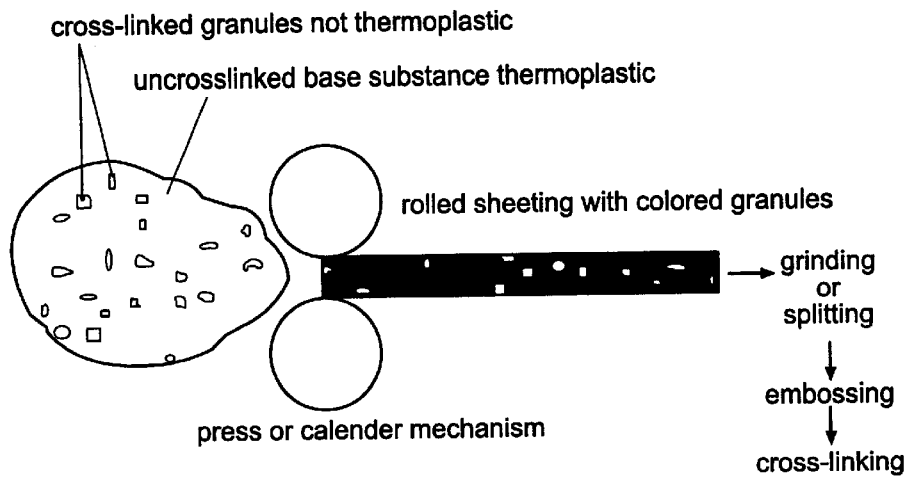
FIG. 3 is a schematic illustration of a preferred embodiment for the production of the floor covering of the present invention (see example 3).
Figure 4:
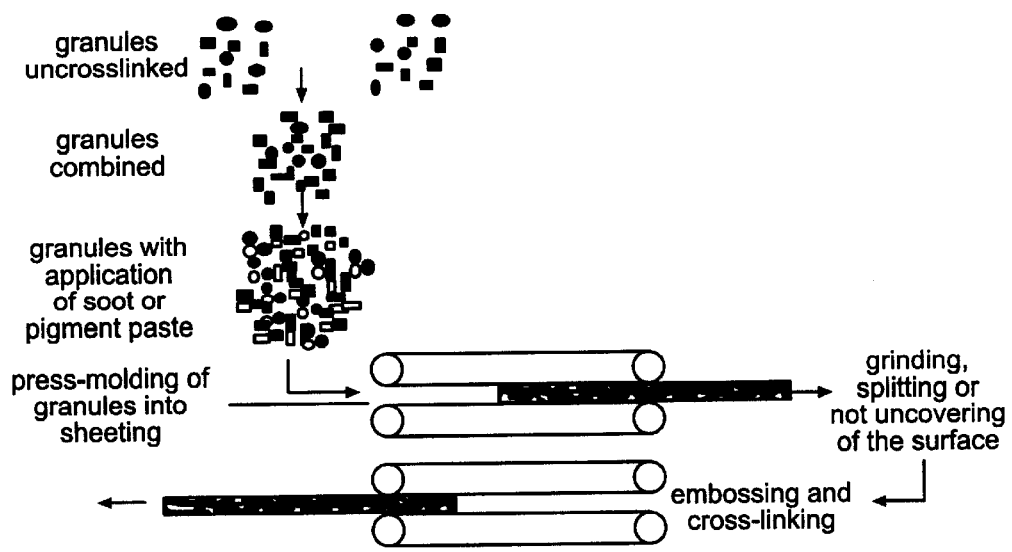
FIG. 4 is another schematic illustration of a preferred embodiment for the production of the floor covering of the present invention (see example 4).

The present invention is explained in more detail by the following examples:

EXAMPLE 1

A double-screw extruder Type ZE 40 made by Berstorff with L/D=40 at D=40, functions as a preparation aggregate, for example. The gravimetric measured compound mixture (PE-VLD, fillers, process enhancing agents, pigments) is plasticized and homogenized within a lengthy intake area (1 OD) by using suitable transporting and kneading elements. By means of a precision metering pump, the mixture for grafting consisting of vinyltrimethoxysiloxane (VTMOS), organic peroxide (DHBP) as well as dibutyltin dilaurate (DBTL) as a catalyst is fed over a cooled metering lance into the compound mass that is maintained at a temperature of 120° C. In this mixing phase the peroxide does still not decompose because of the low temperature. By subsequent increasing of the temperature in the following extruder elements, peroxide decomposes and initiates grafting of VTMO at PE-VLD by radical reaction and also initiates cross-linking of PE-VLD with one another. Thereby, PE-VLD loses its thermoplastic character that is necessary for molding. A vacuum de-gassing device removes volatile reaction products (ethanol, methanol, n-isobutanol) in order not to emit later into the ambient atmosphere. The cross-linked PE-VLD is again degraded in the last kneading zone to make the substance thermoplastic once more. The mass is either granulated according to the pattern design—various granule colors are statically press-molded as a granule mixture—or it is made into sheeting by feeding it through a wide slotted nozzle onto an adjacent smoothing roll—whereby subsequently colored designed granules are pressed into the still heated sheeting by a backing roll. The floor covering is then smoothened in a continuous press. The cross-linking is caused by aqueous initiation and condensation reaction of methylsiloxane or silanol in the commonly known manner.

EXAMPLE 2

A Banbury mixer (plunger-type mixer) or a double-screw mixer (e.g. ZE 40, Berstorff) functions here as a preparation aggregate by choice. In this example, a cold pre-mixed mixture is directly fed into the mixer together with peroxide (without VTMOS, DBTL). The compounding is performed within 4–7 minutes and preferably under a temperature of 140° C. (135° ). This substance is subsequently fed through a wide slotted nozzle and a smoothing roll or a press at a temperature of 120–130° C. and then processed into sheeting. This sheeting can now possibly be made into granules, which then may be mixed and press-molded with other designed granules or the sheeting may be sprinkled with differently designed granules and subsequent continuously fed into a double-band press at a pressure of 0.1 kg/cm$^2$ to 5 kg/cm$^2$, but preferably in the range of 1.5 to 2.5 kg/cm$^2$. The temperature is raised above the decomposition temperature of the peroxide (190–210° C.) during press-molding and cross-linking of the PE-VLD is initiated within 1–3 minutes. The product is then cooled down to approximately 80–110° C. in a cooling area and is tempered at a temperature of 80–90° C.

EXAMPLE 3

A Banbury mixer (plunger-type mixer, internal mixer) functions as a preparation aggregate whereby the pre-mixed mixture is here also fed directly into the mixer and is compounded there preferably at a temperature of 135° C. within 4–7 minutes. The mass is subsequently processed into sheeting by means of a press at a temperature of 120–130° C. Patterns may be produced whereby the already cross-linked (which means duroplastic or elastomeric) color contrasting granules are either added into the Banbury mixer in the final stages of the kneading process or are sprinkled into the to-be-kneaded built-up substance in the press. The first possibility is more advantageous since there is a more even distribution of granules. Subsequently, the sheeting surface is uncovered, depending on the degree of smearing of the designed texture, by grinding or continuous splitting (similar to the leather processing technology). The product is later embossed and cross-linked in a continuous press at a pressure of 0.1 kg/cm$^2$ to 5 kg/cm$^2$, but preferably 1.5 to 2.5 kg/cm$^2$. The temperature is brought above the decomposition temperature of the peroxide (190–210° C.) during press-molding and cross-linking of the PE-VLD is initiated within 1–3 minutes. The product is then cooled down to a temperature of approximately 80–1100 in a cooling area and is then tempered at a temperature of 80–90° C.

EXAMPLE 4

In this example, the uncrosslinked granules are either produced by the Banbury mixer/press granulating technology, whereby the final mixed mixture is compounded at a temperature of 135° C., is press-molded at 120–130° C., and then cold granulated (preferably 8–10 mm). Subsequently, the granules are mantled with a paste in a mixing drum consisting of the following substances:

| Substance | Type/Make | Supplier | Weight % |
|---|---|---|---|
| white oil or | Dealen CP 31 N | DEA | 15–50 |
| conductive soot or | Sicoplast V 00 6053 | Sigle | 8–50 |
| multi-colored pigments as described | Bayferrox 140 Bayferrox 530 Hostaprint A 2 R 31 Kronos 2200 Sicoplast V 00-8920 | Bayer Bayer Hoechst Kronos Titan BASF | 5–50 |
| dispersant | glycerin monostearate | Hoechst | 0–1 |
| extender | Omyacarb 6 | Omya | 0–30 |

The portion of paste per kilogram of granules amounts to 5–25 weight percent, preferably 8.5 weight percent. The mantled granules are now press-molded into sheeting in a continuous press, calibrated to a certain thickness and simultaneously cross-linked at a temperature of 200° C., if the surface of the floor covering is not to be embossed. The uncovering of the actual floor covering pattern is performed by a choice of splitting technology or grinding of the multi-colored smeared outer skin.

A floor covering may be produced that has an electric conduction resistance of less than $10^{-3}$ ohm (measured according to DIN 54346) by applying with a pug mill an electrically conductive soot paste to the functional granules and by subsequent press-molding into sheeting.

It has been proven in tests that press-molding should be conducted without cross-linking should the surface be embossed. Embossing is performed after uncovering of the surface, whereby it is simultaneously cross-linked during continuous contact at 190–210° C. and at a pressure of 0.1 kg/cm² to 5 kg/cm², but preferably 1.5 to 2.5 kg/cm². The temperature is brought above the decomposition temperature of the peroxide (190–210°) during the press-molding process and cross-linking of the PE-VLD is initiated within 1–3 minutes. The product is then cooled down to a temperature of approximately 80–110° in a cooling zone and is tempered at a temperature of 80–90° C. A special optical effect may be obtained by the application of black or multi-colored pigments. Surprisingly, it has been shown that oil in the mantle may migrate into the outer area of the granules because of the outstanding oil compatibility of PE-VLD and thereby pigments are more likely to be present in the outer areas.

Evaluation of Examples 1, 3 and 4

EXAMPLE 1

| | Test H182 Procedure 1 | rubber-based floor covering Product 1 | rubber-based floor covering Product 2 |
|---|---|---|---|
| Exact 4033 | 53.5 | | |
| Omyacarb 6 | 23.1 | | |
| Sirkon SF 300 | 21.4 | | |
| Silan SF 300 | 0.5 | | |
| DHBP | 0.5 | | |
| DBTL | 0.01 | | |
| Barolub FTA | 1.0 | | |
| Parameters | | | |
| Zone 1 [° C.] | 135 | | |
| Zone 1 | 135 | | |
| Zone 1 | 135 | | |
| Zone 1 | 135 | | |
| Zone 1 | 190 | | |
| Zone 1 | 210 | | |
| Zone 1 | 210 | | |
| Zone 1 | 180 | | |
| extruder speed [rotations/min] | 220 | | |
| granulator matrix [mm] | 9 × 9 | | |
| double-band press press conditions, pressure [kg/cm²] temperature | 2,2 | | |
| Zone 1 [° C.] | 180 | | |
| Zone 2 | 200 | | |
| Zone 3 | 120 | | |
| floor covering thickness calibration [mm] | 4.1 | | |
| splitting of sheeting into two parts [mm] | 2.0 | | |
| surface energy [mN/m] | 28.8 | | |
| surface energy after corona [mN/m] | 56.2 | | |
| primer (g/m⁴) | 20.0 | | |
| wet application | Intrafol D 1 151/2 (Fuller Company) | | |
| technical measurements | | | |
| peeling values DIN 16860 [N/mm] adhesive Supra Strong (Wulf Company) | 3.4 | 1.3 | 1.4 |
| embossing characteristics EN 433 recovery [%] 150 min. | 90.8 | 83.4 | 83.2 |
| Shore A hardness | 85 | 90 | 89 |
| Shore D hardness | 31 | 41 | 44 |
| density [g/cm³] | 1.259 | 1.529 | 1.666 |
| abrasion characteristics | | | |
| DIN 53516, ISO 4649, prEN 6 [mm²] | 94.4 | 163.8 | 259.9 |
| tension test DIN 53504 | | | |
| tension force F-max [N/mm²] | 9.1 | 7.6 | 7.8 |
| tensile force F-breaking | 9.1 | 7.5 | 7.7 |
| max. tension force stretching [%] | 803 | 75 | 28 |
| further ripping resistance | 36.7 | 27.6 | 21.4 |
| lengthwise | 34.1 | 18.9 | 24.3 |

-continued

| | Test H182 Procedure 1 | rubber-based floor covering Product 1 | rubber-based floor covering Product 2 |
|---|---|---|---|
| DIN 53515 [N/mm] crosswise burning characteristics DIN 4102 part 14 "B1" | | | |
| burning distance [cm] | 18 | 25 | 27 |
| smoke density integral of % (transmission) × min. humidity | 32 | 675 | 552 |
| volume increase | 0.038 | 0.077 | 0.083 |
| humidity absorption [%] | 0.14 | 0.56 | 0.92 |
| total emission-VOC according to Flec-method GC MS [μg/(m² × h)] *(1 | 101 | 6744 | 11465 |

EXAMPLE 3

| | Test H 246 Procedure 3 | rubber-based floor covering Product 1 |
|---|---|---|
| DSH 8501 | 53.5 | |
| DSH 58.000.52 | | |
| Omyacarb 6 | 23.1 | |
| Sirkon SF 300 | 21.4 | |
| P 820 | | |
| Martinal OL 313 | | |
| Silan XL 10 | 0.5 | |
| DHBP | 0.5 | |
| DBTL | 0.01 | |
| Baerolub FTA | 1.0 | |
| Parameters | | |
| Banbury mixing time [min] | 4.5 | |
| Banbury temperature [° C.] | 120 | |
| Mass temp after Banbury [° C.] | 135 | |
| parts of decorative colors [%] | 8 | |
| grain size of granules manufactured in this procedure [mm] measured into mixer | 2–3.5 | |
| press temperature | 130° C. | |
| grinding of sheeting [m/min] | 4 | |
| press smoothing temp | 135° C. | |
| pressure [kg/cm²] | 1.1 | |
| embossing | embossing roll in press | |
| cross-linking in double-strip press | 200° C. | |
| press pressure [kg/cm²] | 1.1 | |
| floor covering thickness calibration [mm] | 2.0 | |
| surface energy [mN/m] | 26.1 | |
| surface energy after corona [mN/m] | 52.3 | |
| primer [g/l] | 20.0 | |
| wet application | Intrafol D 1151/2 (Fuller Company) | |
| technical measurements | | |
| peeling values DIN 16860 [N/mm[ | 3.3 | 1.3 |

-continued

| | Test H 246 Procedure 3 | rubber-based floor covering Product 1 |
|---|---|---|
| adhesive Supra Strong (Wulf Company) | | |
| embossing characteristics recovery [%] 150 min. EN 433 | 91.3 | 83.4 |
| Shore A hardness | 86 | 90 |
| Shore D hardness | 31 | 41 |
| density [g/cm²] | 1.282 | 1.529 |
| abrasion characteristics | | |
| DIN 53516, ISO 4649, prEN 6 [mm²] | 79.8 | 163.8 |
| tension test | | |
| tension force DIN 53504 F-max [N/mm²] | 9.3 | 7.6 |
| tensile force, F-breaking [N/mm] | 9.0 | 7.5 |
| max. tension force stretching [%] | 752 | 75 |
| further ripping resistance lengthwise DIN 53515 [N/mm] crosswise | 36.5 | 27.6 |
| | 34.1 | 18.9 |
| burning characteristics DIN 4102 part 14 "B1" | | |
| burning distance | 21 | 25 |
| smoke density humidity | 37 | 675 |
| volume increase [%] | 0.042 | 0.077 |
| humidity absorption [%] | 0.15 | 0.56 |
| total emission-VOC after Flec-method GC-MS [μg/(m² × h)] *(1 | 155 | 6744 |

EXAMPLE 4

| | Test H289 Procedure 4 | rubber-based floor covering Product 2 |
|---|---|---|
| Parameters | | |
| DSH 85.01 | | |
| DSH 58,000.52 | 49.5 | |
| Omyacarb 6 | | |
| Sirkon SF 300 | 16.8 | |
| P820 | 19.3 | |
| Martinal OL313 | 12.6 | |
| Silan XL 10 | | |
| DHBP | 0.8 | |
| DBTL | | |
| Barolub FTA | 1.0 | |
| Parameters | | |
| Zone 1 [° C.] | 130 | |
| Zone 2 | 130 | |
| Zone 3 | | |
| Zone 4 | | |
| Zone 5 | | |
| Zone 6 | | |
| Zone 1 | | |
| Zone 1 | | |

-continued

| | Test H289 Procedure 4 | rubber-based floor covering Product 2 |
|---|---|---|
| extruder speed [rotations/min] | | |
| granulator matrix [mm] | 9 × 9 | |
| granule mantled with paste | | |
| sprinkling on double-strip press [mm] | 6–6.5 | |
| double-band press | 2.2 | |
| press conditions, pressure [kg/cm$^2$] | | |
| floor covering thickness calibration [mm] | 4.1 | |
| splitting of sheeting into two parts [mm] | 2.0 | |
| embossing | | |
| cross-linking in double-strip press | | |
| press pressure [kg/cm$^2$] | | |
| temperature | | |
| Zone 1 [° C.] | 180 | |
| Zone 2 | 200 | |
| Zone 3 | 120 | |
| floor covering thickness calibration [mm] | | |
| splitting of sheeting into two parts [mm] | 2.0 | |
| surface energy [mN/m] | 25.9 | |
| surface energy after | | |
| corona [mN/m] | 50.1 | |
| primer (g/m$^4$) | 20.0 | |
| wet application | Intrafol D 1 151/2 (Fuller Company) | |
| technical measurements | | |
| peeling values DIN 16860 [N/mm] adhesive Supra Strong (Wulf Company) | 5.1 | 1.4 |
| embossing characteristics recovery EN 433 90.8 [%] 150 min. | 93.1 | 83.2 |
| Shore A hardness | 89 | 89 |
| Shore D hardness | 46 | 44 |
| density [g/cm$^3$] | 1.354 | 1.666 |
| abrasion characteristics | | |
| DIN 53516, ISO 4649, prEN 6 [mm$^2$] | 67.3 | 259.9 |
| tension test | | |
| tension force F-max [N/mm$^2$] DIN 53504 | 9.6 | 7.8 |
| tensile force F-breaking | 9.4 | 7.7 |
| max. tension force stretching [%] | 356 | 25 |
| further ripping resistance lengthwise | 40.2 | 21.4 |
| DIN 53515 [N/mm] crosswise | 38.6 | 24.3 |
| burning characteristics DIN 4102 part 14 "B1" | | |
| burning distance [cm] | 20 | 27 |
| smoke density | 33 | 552 |
| humidity | | |
| volume increase [%] | 0.023 | 0.083 |
| humidity absorption [%] | 0.14 | 0.92 |
| total emission-VOC according to Flec-method GC MS [μg/(m$^2$ × h)] *(1 | 91 | 11465 |

*(1: Flec-method
measuring parameters: FLEC  ATD  GC/MSD
flow Flec: 100 ml/min desorption time: 5 min FID separation column: HP-1
flow Tenax: 2 + 40 ml/m desorption temp: 200° C. MSD sep. column: HP-5 MS
rel. flow % 50° cooling drop temp. −20° C. start temp: 50° C.
Temp: 23° C. cooling drop temp 300° C. end temp: 280° C.
Tenax: 100 mg heating completion time: 2 min heating rate 5°/min
Time 24h transfer temp: 275° C. low mass: 45
blind test 1h split 10 ml/min high mass: 550

EXAMPLE 5

Granules are placed into a Banbury mixer or a double-screw mixer for compounding whereby the granules contain 35 parts by weight of DOW XU 58000.52, 20 parts by weight of Sillitin N85 (Hoffmann Company, FRG), 0.5 parts by weight of stearic acid ("FTA") and 0.3 parts by weight of triallylcyanurate ("TAC"). Subsequently, the obtained granules are wetted with a solution that contains, for example, 0.5–3 or 2 parts by weight of Dealen CP 31 N (DEA) and 1 part by weight of DHBP. These wetted granules are mixed with a powder mix that contains 20 parts by weight of DOW NG 2431.10 E (DOW), 5 parts by weight of Kronos 2200 (Kronos Company), 10 parts by weight of Martinal ON 310 (Martinswerk Company) and 2 parts by weight of multi-colored pigments. This is done to obtain the necessary flow of particles for further processing.

These thereby produced unmantled granules are sprinkled on a suitable backing and are heated to a temperature of 160° C. by a IR heater and/or hot air after being pre-compressed. The pre-heated material is press-molded at a temperature of 195 to 200° C. under a pressure of 1.2–2 bar/cm$^2$ and is simultaneously cross-linked. The uncovering of the floor covering pattern may be performed by splitting technology or by grinding of the outer skin.

The floor covering obtained according to this example has a very low emission of volatile elements in addition to the outstanding qualities of the material.

EXAMPLE 6

The processing is the same as in example 5, with the exception that further additional parts of a partially cross-linked mass containing 35 parts by weight of DOW X2 58000.52, 20 parts by weight of Sillitin N85, 0.5 parts by weight of FTA, 0.4 parts by weight of DEHP and 0.3 parts by weight of TAC is used for the preparation of the initial granules. A relief texture of the flat product may be obtained by the use of the partially cross-linked substance, which is essentially completely cross-linked during press-molding by migration of the peroxide into the granule particles. The thereby produced floor covering is also less slippery when wet in addition to the special optical effect.

EXAMPLE 7

Affinity EG B200 is compounded with Luparco 231-SRA-40 in the extruder at a temperature of 190° C., whereby partially cross-linked granules are obtained. The further processing steps are the same as in example 6.

From the results it becomes apparent that the innovative floor coverings have a considerably lower emission of volatile substances than currently known state-of-the-art rubber-based floor coverings. Furthermore, the innovative floor coverings have an outstanding resistance to chemicals, are aging resistant and are resistant to abrasion.

What is claimed is:

1. A method for manufacturing a floor covering, comprising the following steps:
    wetting of particles with a solution that contains at least one aromatic-free organic peroxide and white oil, wherein said particles contain uncrosslinked or partially cross-linked elastomer comprising a polyolefin having a density of <0.918 g/cm$^3$ as a polymeric binder in form of a grinding stock or granules,
    mixing of said wetted particles with a powder mix containing a polyethylene (PE) powder for the production of free-flowing particles,
    placing said free-flowing particles on a strip, and after pre-compressing of said particles, heating the pre-compressed particles to a temperature at which the peroxide has a sufficiently lengthy stability, and
    press-molding the pre-heated particles in a suitable device at a temperature whereby the half life period of said peroxide is decreased in such a manner that cross-linking initiated by said peroxide occurs simultaneously to obtain a flat product.

2. The method according to claim 1, wherein said elastomer is polyethylene or a copolymer made from ethylene with at least one other olefin.

3. The method according to claim 1 or 2, wherein said polyolefin has a density of 0.86 to 0.87 g/cm$^3$.

4. The method according to claim 1 or 2, wherein the particles are compounded with at least one peroxide and a process enhancing additive in the initial step.

5. The method according to claim 4, wherein said process enhancing additive is selected from alkoxysilanes, alkylenealkoxysilanes, cyanuric acid derivatives and mixtures thereof.

6. The method according to claim 1 or 2, wherein the powder mix contains additional fillers and/or pigments as well as optionally processing agents, antioxidants and UV stabilizers.

7. The method according to claim 1 or 2, further comprising the step of designing the floor covering in various colors.

8. The method according to claim 1 or 2, wherein the floor covering is of homogeneous construction.

9. The method according to claim 1 or 2, comprising the steps of providing a backing in the form of a sheeting and applying an elastomer as defined in any one of the preceding claims on one side of said backing.

10. A method for manufacturing a product, comprising the following steps:
    wetting of particles with a solution comprising at least one cross-linking agent under conditions sufficient to infuse said particles with the at least one cross-linking agent, wherein said particles contain uncrosslinked or partially cross-linked elastomer comprising a polyolefin having a density of <0.918 g/cm$^3$ as a polymeric binder,
    mixing of said wetted particles with a powder mix comprising a polyethylene (PE) powder for the production of free-flowing particles,
    placing said free-flowing particles on a strip and compressing said free-flowing particles,
    heating the compressed particles to a temperature at which the at least one cross-linking agent has a sufficiently lengthy stability, and
    press-molding the heated particles under conditions sufficient to cross-link the elastomer substantially simultaneously therewith to form the product.

11. The method according to claim 10, wherein said elastomer is polyethylene or a copolymer made from ethylene with at least one other olefin.

12. The method according to claim 10 or 11, wherein said polyolefin has a density of about 0.85 to 0.892 g/cm$^3$.

13. The method according to claim 10 or 11, wherein the particles are compounded with at least one peroxide and a process enhancing additive in the initial step.

14. The method according to claim 13, wherein said process enhancing additive is selected from alkoxysilanes, alkylenealkoxysilanes, cyanuric acid derivatives and mixtures thereof.

15. The method according to claim 10 or 11, wherein the powder mix contains additional fillers and/or pigments as well as optionally processing agents, antioxidants and UV stabilizers.

16. The method according to claim 10 or 11, further comprising the step of designing the product in various colors.

17. The method according to claim 10 or 11, wherein the product is of homogeneous construction.

18. The method according to claim 10 or 11, comprising the steps of providing a backing in the form of a sheeting and applying an elastomer as defined in any one of the preceding claims on one side of said backing.

* * * * *